United States Patent [19]

Simmonds

[11] Patent Number: 4,498,826
[45] Date of Patent: Feb. 12, 1985

[54] SELF LOCKING NUT INCLUDING AN AXIALLY EXTENDING REINFORCEMENT

[76] Inventor: Oliver E. Simmonds, Old Orchard, Checkendon, Near Reading, Berkshire, England

[21] Appl. No.: 564,761

[22] Filed: Dec. 1, 1983

Related U.S. Application Data

[63] Continuation of Ser. No. 255,942, Apr. 20, 1981, abandoned.

[30] Foreign Application Priority Data

Apr. 30, 1980 [GB] United Kingdom ................. 8014246

[51] Int. Cl.³ ............................................. F16B 39/00
[52] U.S. Cl. .................................... 411/301; 411/324; 411/432; 411/908
[58] Field of Search ................................ 411/301-303, 411/309-311, 324, 334, 333, 427, 432, 438, 900-903, 907, 908; 285/331, 423

[56] References Cited

U.S. PATENT DOCUMENTS

| | | | |
|---|---|---|---|
| 2,900,000 | 8/1959 | Parr | 411/303 |
| 2,943,967 | 7/1960 | Simon | 285/423 |
| 3,001,567 | 9/1961 | Brill | 411/301 |
| 3,255,795 | 6/1966 | Ginsburg | 411/301 |
| 3,614,137 | 10/1971 | Jacobson | 285/423 |
| 3,843,169 | 10/1974 | Wise | 285/331 |

FOREIGN PATENT DOCUMENTS

| | | | |
|---|---|---|---|
| 167233 | 5/1950 | Fed. Rep. of Germany | 411/301 |
| 1354351 | 5/1974 | United Kingdom | 411/908 |

Primary Examiner—Thomas J. Holko
Assistant Examiner—Neill R. Wilson
Attorney, Agent, or Firm—Edwin E. Greigg

[57] ABSTRACT

A self-locking nut has a threaded bore for receiving the threaded shank of a co-operating bolt, which bore terminates within the nut body in a reduced bore diameter portion which may be unthreaded. The maximum diameter of this portion is less than the maximum diameter of the remainder of the bore. The nut body is formed of a plastics or other lightweight material and is reinforced by one or more inclusions of predetermined axial extent, formed of a material having a tensile strength greater than the material of the nut body, and embedded or encastred within the material of the nut body at a greater radius than the maximum radius of the thread.

3 Claims, 4 Drawing Figures

SELF LOCKING NUT INCLUDING AN AXIALLY EXTENDING REINFORCEMENT

This is a continuation of application Ser. No. 255,942 filed Apr. 20, 1981, now abandoned.

DESCRIPTION

This invention relates to nuts. More particularly it is concerned with the provision of relatively inexpensive self-locking nuts which are relatively simple in form and easy to manufacture and which are reliable in use. The present invention has been developed with the particular needs of the aero-space industry in mind, but locking nuts constructed in accordance with the present invention are not restricted to use in that industry alone.

Locking nuts have had a long and chequered history. The first really reliable self-locking nuts comprised a conventional hexagonal metal nut body at one axial end of which was superimposed and rigidly held in position a collar of fibrous or similar material having a central hole whose diameter was equal to or a little greater than the core diameter of the thread. When a bolt was inserted into such a nut, it would perform in the conventional manner until the advancing bolt came up against the fibrous collar. At this point the axial resistance of the collar forces the threads of the nut and bolt together and thus induces a torque resistance to the rotation of the nut upon the bolt. As the bolt is further screwed into the nut, it cuts a thread in the fibrous collar, thus introducing a secondary torque resistance.

This type of self-locking nut was rapidly and universally adopted and has been given the technical term "stiff nuts". Numerous improvements upon this basic arrangement were devised, particularly to ensure that the fibrous collar did not tend to rotate relative to the nub body, for any such rotation would weaken or destroy the locking properties of the nut.

With the development of plastics and the adoption of these materials in industry since the second world war, plastics have been substituted for the fibrous collar in the conventional stiff nuts, with some success.

There have, of course, been very many other proposals for the construction and manufacture of self-locking nuts. Indeed, it is fair to say that the literature, and particularly the patent literature, in this art is replete with paper proposals. The great majority of these proposals have proved unmitigated failures. Designs which appeared in the laboratory to work adequately have been found insufficiently reliable in practical field tests and in large scale manufacture. Very many of the prior proposals involved altogether too complicated engineering to make the nuts at an economical price.

There is a continuing need in the industry for simple reliable and cheap self locking nuts. Additionally, there are special requirements in the aero-space industries and in other industries where weight reduction is of paramount importance for simple cheap and reliable light weight nuts. There is also an unsatisfied need for simple cheap and reliable self-locking nuts for use where magnetic or other reasons require that the mass of metal in a nut must be kept to a minimum.

Attempts to produce self-locking nuts from plastic materials have generally failed. Experiments have shown that there is a tendency for the nut body to spread or burst outwardly through its side walls and/or in the axial direction of the nut as a result of the tightening which provides a locking function. This feature is both undesirable in itself and may lead to destruction of the nut.

It has been found that by a simple expedient cheap and reliable self-locking nuts can be made from plastic materials without the locking action tending to result in bursting of the nut.

In accordance with the present invention, there is provided a self-locking nut comprising a nut body, having a threaded bore opening at one axial end thereof and adapted to receive the threaded shank of a co-operating bolt, the bore terminates within the nut body in a reduced diameter portion, the maximum diameter of which is less than the maximum diameter of the remainder of the bore; the nut body being formed of a plastic or other light-weight material and being reinforced by one or more inclusions of predetermined axial extent, formed of a material having a tensile strength greater than the material of the nut body, and embedded or encastred therein at a greater radius than the maximum radius of the thread.

The nut body is most preferably formed of a plastic material such as nylon in which the reinforcement may be embedded or encastred in situ when the nut body is being formed by injection moulding or other appropriate process.

Preferably the reduced diameter portion of the bore is unthreaded and has a diameter equal to or greater than the core diameter of the thread.

The reinforcement may consist of one or more complete rings coaxial with the axis of the bore, or of one or more complete bands similarly located, or may take other forms, for example a helix formed of wire stock.

Embodiments of self-locking nut constructed in accordance with the present invention are described hereinbelow by way of example only with reference to the accompanying drawings, in which.

Figure 1:
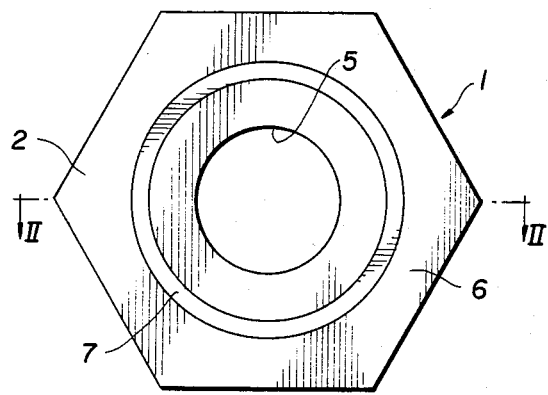
FIG. 1 shows an end view of an embodiment of nut in accordance with this invention.
Figure 2:
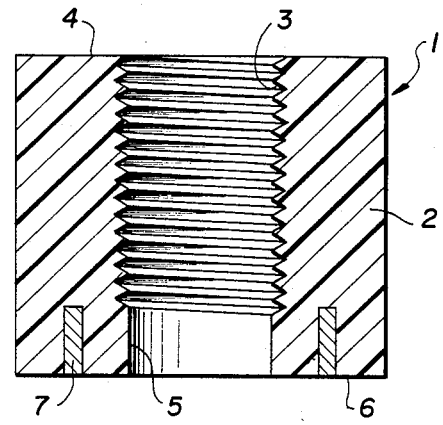
FIG. 2 shows a sectional view taken along the line II—II in FIG. 1.

The self-locking nut generally indicated 1 in FIGS. 1 and 2 comprises a nut body 2 suitably moulded or cast from a relatively hard plastic material such as a hard nylon. The nut body has a threaded bore 3 which progresses inwardly from one axial face 4 of the nut body. The thread may be any of the conventional threads whereby the bore 3 is adapted to receive the threaded shank of a co-operating bolt of the same conventional thread. The bore terminates within the nut body in a reduced bore diameter portion 5 which, in the particular arrangement illustrated, penetrates through to the other axial end face 6 of the nut body. Reduced bore diameter portion 5 must in general have a diameter which is less than the maximum diameter of the main threaded portion 3 of the bore and may itself be threaded, though not to the full depth of the thread. However, in the preferred arrangement portion 5 is unthreaded and has a diameter which is greater than or equal to (and preferably a little more than equal to) the core diameter of the threaded portion 3. A metal band 7, suitably made of steel or other material having good tensile properties is provided as reinforcement in the plastic material of nut body 2 about the unthreaded portion 5 of the bore at a greater radius than the maximum radius of the thread. In the particular arrangement illustrated in FIGS. 1 and 2, band 7 extends along substantially the whole length of the unthreaded portion of the bore from end face 6. In alternative arrangements the band 7 may be fully embedded within the material of the nut body so that it does not extend to the end face 6, or the band may be merely encastred in the material of the nut body so as to have a portion thereof which extends freely outwardly of the nut beyond surface 6. Other arrangements are possible. The reinforcement need not always extend over the full axial length of the unthreaded portion. The band need not be complete (i.e. closed to form a complete cylindrical band). There may be a plurality of discreet inclusions effectively defining a broken annulus about the axis of the bore. The band may be replaced by a ring formed of wire stock. The reinforcement, whatever form it takes, is conveniently included in the material of the nut body when it is being formed by injection moulding or other appropriate process; or may simply be pushed into place after forming the nut body.

In operation, when the nut 1 is offered up to a cooperating bolt, the nut will turn freely on the bolt until the bolt reaches the end of the threaded portion 3 within the nut body; thereafter, the thread of the bolt will press against and then cut into the material of the nut body in the unthreaded portion 5. The resistance to forward movement of the bolt will, as in the conventional stiff-nut, tend to press the threads of nut and bolt together axially in a locking fashion. Additional resistance to further threading of the nut onto the bolt or unthreading of the nut from the bolt is created by direct resistance between the material of the unthreaded portion 5 of the bore and the bolt thread. The metal band 7 tends to resist radially outward deformation of the nut body over the unthreaded length of the bore so tending to add to the locking effect and at the same time resisting radially outward bursting damage to the nut body. It also improves the axial strength of the nut against stripping of the thread.

We have found that there is a tendency in some cases for the bolt to push the unthreaded part of the nut apart from the threaded part of the nut in the arrangement of FIGS. 1 and 2 so that the nut may fail by axial separation. In an effort to overcome this further problem and to provide a substantially more strengthened nut, still substantially formed of plastic or similar lightweight material, we have devised the embodiment of nut shown in FIG. 3.

Figure 3:
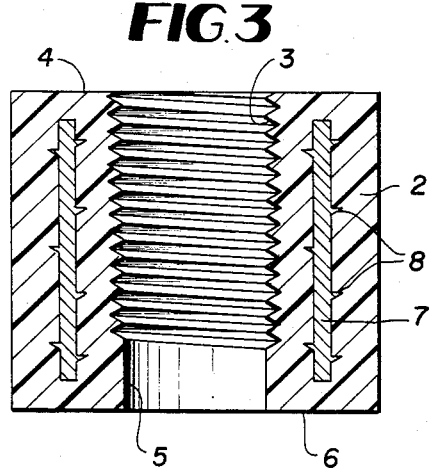
FIGS. 3 and 4 show views similar to FIG. 2 of alternative embodiments.

As comparison between FIGS. 2 and 3 will show, the shape and configuration of the nut as a whole is identical in FIG. 3 to FIG. 2. The differences between the two nuts arise in large part from the differences in location and axial extent of the reinforcement in the two cases. Like reference numerals are used for identical parts in the two cases. In the case of FIG. 3, the band 7 is entirely buried in the plastic material and extends from adjacent the face 4 to adjacent the face 6 so as to provide a substantial measure of reinforcement to the body of the nut over almost the whole of its axial extent. In order to guard against any tendency for the nut to separate axially, the metal band 7 is provided with anchoring means for firmly securing the metal band to the body of the material both on its inner and outer circumferential surfaces. The anchoring means may take various forms such as a series of projections 8 extending from both the inner and outer circumferential surfaces of the band. Other possibilities include one or more helically extending ribs on the inner and/or outer circumferential surfaces of the band.

Figure 4:
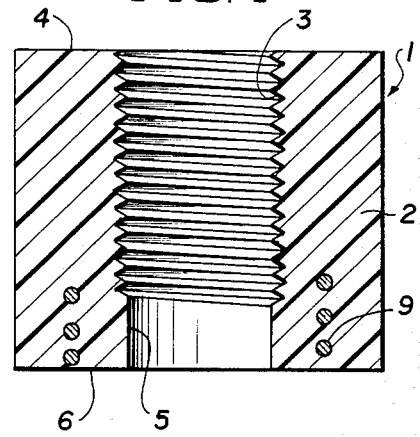

The arrangement of FIG. 4 is generally similar to that of FIGS. 1 and 2 except that the reinforcement is here provided as a helix 9 formed of steel wire stock and having several complete turns.

Although the illustrated embodiments of nut both have the configuration externally of a conventional hexagonal nut, the invention is not so limited. The external configuration of the nut body may take any of the conventional forms, including wing-nut form, forms including less than six or more than six faces on the nut body, arrangements with a collar or crown extending from the non-bearing face of the nut body and arrangements including an integral dome, or the so-called "anchor" nut form.

I claim:

1. A self-locking nut made of a plastic material, said nut including a nut body including a coaxially aligned bore extending through said nut body and open to each axial end of said nut body, said axially aligned bore having a first bore portion extending from one axial end and terminating at a second bore portion which extends from the termination of said first bore portion to an axial end of said nut body, said first bore portion having a length and diameter which is greater than a length and diameter of said second bore portion of said axially aligned bore, said first bore portion having threads thereon extending inwardly from one axial end and terminating at said second bore portion and adapted to receive a threaded shank end of a cooperating bolt having the same thread as said threaded first bore portion, said second bore portion adapted to receive said threaded shank end of said bolt with said bolt forming its own threads within said second bore portion of said axially aligned bore thereby locking said nut body onto said bolt, a cylindrical reinforcement embedded within said nut body radially opposite said second bore portion, said reinforcement having a greater diameter than said threaded first bore portion, a length which is substantially the same as that of said second bore portion and a tensile strength which is greater than that of said nut body thereby forming a reinforcement for said non-threaded second bore portion of said axial bore during threading of a shank end of a bolt into said second bore portion of said axially aligned bore.

2. A self-locking nut according to claim 1, wherein said reinforcement comprises a cylindrical ring.

3. A self-locking nut according to claim 1, wherein the reinforcement comprises a helix formed of wire stock.

* * * * *